Aug. 27, 1968 P. O. DAHLMAN 3,399,278

TIME DIVISION AND FREQUENCY DIVISION MULTIPLEXING SYSTEM

Filed Oct. 15, 1962

INVENTOR
PER O. DAHLMAN

BY Edward G. Fiorito

AGENT

United States Patent Office 3,399,278

Patented Aug. 27, 1968

3,399,278

TIME DIVISION AND FREQUENCY DIVISION MULTIPLEXING SYSTEM

Per Olof Dahlman, Bethesda, Md., assignor to International Business Machines Corporation, New York, N.Y., a corporation of New York Filed Oct. 15, 1962, Ser. No. 230,518
2 Claims. (Cl. 179—15)

This invention relates to switching systems and more particularly such systems which use time division multiplexed switching and frequency division trunk line multiplexing.

When transmitting large numbers of signals, for example telephone conversations or data signals, over long distances, it is ordinarily desirable to combine the conversations into a single complex signal for transmission over a common transmission line. Frequency multiplexing has been found to be a convenient way of combining conversations into frequency divided channels. Once the frequency multiplexed channels have been transmitted to a distant point, it is ordinarily necessary to switch the individual channels to local telephone lines or to other channels in frequency multiplexed lines for transmission to still other distant points. It has been found that time division multiplexing is a desirable way to perform this switching. Thus a problem often occurs in that the frequency divided channels must be converted into time divided channels for switching purposes, and then back to frequency divided channels for long distance transmission. Costly equipment is required to perform this conversion, switching, and reconversion.

It is an object of the present invention to provide a new apparatus for switching a plurality of signals.

It is a further object of the present invention to provide a switching system capable of accepting frequency divided signals, switching these signals on a time divided basis and generating a frequency divided output.

It is another object of the present invention to provide apparatus for simultaneously switching signals from frequency multiplexed lines and signals from local input channels.

Still another object of the present invention is to provide apparatus for simultaneously switching signals from frequency multiplexed lines and signals from local inputs and for generating signals for frequency multiplexed lines and signals for local output channels.

The above objects are accomplished in accordance with the broad aspets of the present invention by employing sampling techniques. The input signals to the switching apparatus are sampled in a sequential manner providing a time division multiplexed signal having time slots for each input signal. Examining the output of each sampling gate using Fourier analysis, the sampled signal is determined to include a spectrum of discrete frequencies located in the upper and lower sidebands of the harmonics of the sampling rate. Time controlled sampling gates distribute the time division multiplexed signal to a plurality of filters, each filter receiving a signal in a particular time slot corresponding to one of the input signals. These filters are arranged to have band-passes coextensive with one of the sidebands of the harmonics of the sampling rate. In this manner the input signal is shifted in frequency to a new location in the frequency spectrum for transmission over a frequency multiplexed line, and is distributed in a time divided fashion to any one of a plurality of frequency bands in the frequency multiplexed line.

By integrating the frequency multiplexed signals with time multiplexing switching means in accordance with the present invention, the oscillators and frequency modulators, conventionally used to convert the frequency divided signals into low frequency signals for time division sampling, are eliminated. Also oscillators and modulators are eliminated in the reconversion process from the time multiplexed signals back to the frequency multiplexed signals for transmission over a frequency multiplexed line.

Another advantage of the present invention is the ability to sample both the local inputs, for example telephone lines, and the frequency multiplexed signals from distant points. All of the sampled signals are merged into a single time multiplexed switching system. There is a great degree of flexibility in switching the time divided signals, allowing them to be routed either to low frequency outputs for local telephone lines, or to be routed to high frequency bands for transmission over frequency multiplexed lines.

The broad aspects of frequency shifting using sampling gates are disclosed and claimed in copending application Ser. No. 230,517 and now abandoned.

The foregoing and other objects, features, and advantages of the invention will be apparent from the following more particular description of a preferred embodiment of the invention, as illustrated in the accompanying drawings.

Figure 1:
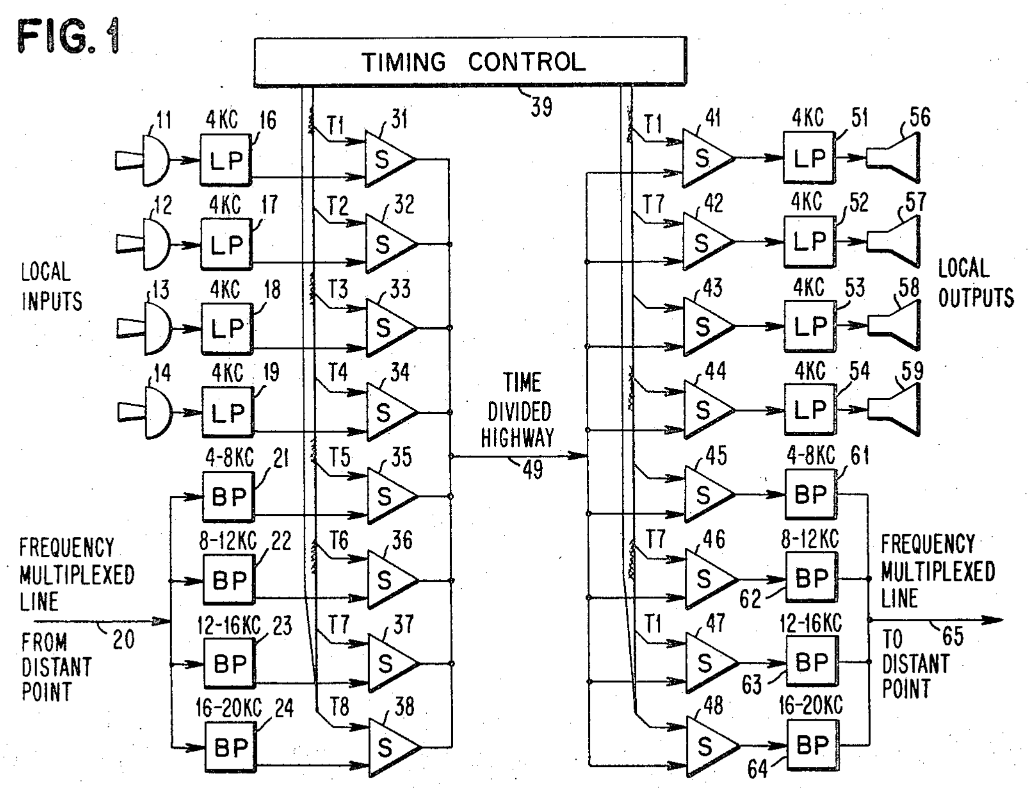
FIG. 1 is a block diagram of a switching system embodying the present invention.

FIG. 1 illustrates how the present invention could be employed in a telephone switching system. Transducers 11–14 illustrate a means for converting four audio signals into four separate electrical signals. The low-pass filters 16–19 limit the maximum frequency component in these signals to less than four kilocycles per second (kc.). Four long distance telephone channels convey signals over the frequency multiplexed line 20 from a distant point. These four channels are separated into four separate frequency bands by the filters 21–24.

The outputs of the filters 16–19 and 21–24 are sampled by the sampling gates 31–38. The timing control 39 operates the gates 31–38 in a sequential manner. Each gate has a separate time slot in the cycle indicated by the designations T1 through T8. Each of the outputs of the gates 31–38 is applied to all of the sampling gates 41–48 through the time divided highway 49. Gates 41–48 are opened by the timing control 39. For example, either or both of gates 41, 47 can be operated only for the duration of time slot T1. Therefore, only the samples from gate 31 pass through gates 41, 47. In a like manner, any of the gates 41–48 can be operated so that the samples from a particular one of the gates 31–38 are passed therethrough.

Low-pass filters 51–54 accept the samples passing through gates 41–44 respectively and filter out all frequency components that are four kc. or more. The transducers 56–59 illustrate a means for converting the electrical signals passing through filters 51–54 respectively into audible signals. The samples passing through gates 45–48 are passed to band-pass filters 61–64. The band-pass of each of the filters 61–64 is selected to occupy a different portion of the frequency spectrum, passing only frequency components between the regions indicated in FIG. 1. The signals from filters 61–64 are frequency multiplexed and in condition for transmission over the frequency multiplexed line 65 to a distant point.

To summarize the operation of the switching system in FIG. 1, local telephone input lines can be switched to other local telephone output lines or to a frequency band for transmission over a frequency multiplexed line. Likewise, frequency multiplexed signals from an input frequency multiplexed line can be switched to either local output lines at audio frequencies, or to other frequency bands for transmission over a frequency multiplexed line output.

Figures 2A, 2B:
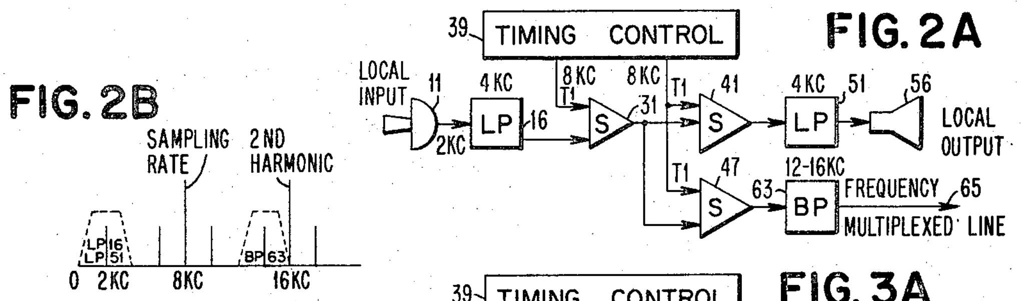
FIG. 2A is a block diagram of a subcombination included in the diagram of FIG. 1.
FIG. 2B is a frequency scale illustrating the frequency spectrum of a sampled signal in FIG. 2A.

The detailed operation of the switching system of FIG. 1 can be illustrated by examining a subcombination thereof shown in FIG. 2A. The block diagram of FIG. 2A illustrates the manner in which a local input signal may be switched to a local output line or to a frequency band for transmission over a frequency multiplexed line. For illustration it will be assumed that a two kc. sound wave is applied to transducer 11 and converted into a two kc. electrical signal. Low-pass filter 16 has a bandwidth from zero to nearly four kc. as illustrated in FIG. 2B. The two kc. signal located at the center of this bandwidth passes through filter 16 and is applied to sampler 31. Sampler 31 is turned on and off at an eight kc. rate by the timing control 39.

The spectrum of the sampled signal at the output of sampler 31 can be determined by using Fourier analysis described for example in the text J. T. Tou, Digital and Sampled Data Control Systems, McGraw-Hill 1959. From this analysis it may be determined that the sampled signal has a spectrum including the original two kc. signal, the sampling rate at eight kc., and also the harmonics of the sampling rate at 16 kc., 24 kc., etc. up to a point in the spectrum as determined by the duration of each sample pulse. Also included in the sampled signal spectrum are the upper and lower sidebands of the harmonics of the sampling rate. For example, the lower sideband of the second harmonic would be 16 kc.—2 kc., or 14 kc. The upper sideband of the second harmonic would be 16 kc.+2 kc. or 18 kc.

Either, or both of the gates 41, 47 are opened in synchronism with the sampler 31 by the timing control 39. This has been designated the T1 time slot. Therefore, the sampled signal having a frequency spectrum as illustrated in FIG. 2B passes to either or both of the filters 51, 63. The low-pass filter 51 passes only that portion of the frequency spectrum below four kc. The only frequency component in the frequency spectrum located in this band region is the original two kc. signal which is passed on to the local output line transducer 56.

Band-pass filter 63 passes only that portion of the frequency spectrum between the 12 to 16 kc. region. The only frequency component occupying this region of the spectrum is the lower sideband of the second harmonic, 14 kc. Only the 14 kc. signal passes through band-pass filter 63 to the frequency multiplexed line.

It can be seen that if the timing control generator 39 had operated one of the gates 45, 46, or 48 instead of gate 47 at time T1 the sampled signal having the frequency spectrum shown in FIG. 2B would have been applied to either of the filters 61, 62, or 64. These latter filters embrace sidebands different from the sideband embraced by the filter 64. Therefore the original two kc. signal could have been shifted to either the 6 kc., 10 kc., 14 kc. or 18 kc. region of the spectrum by merely operating one of the gates 45–48 in synchronism with the gate 31.

Figures 3A, 3B:
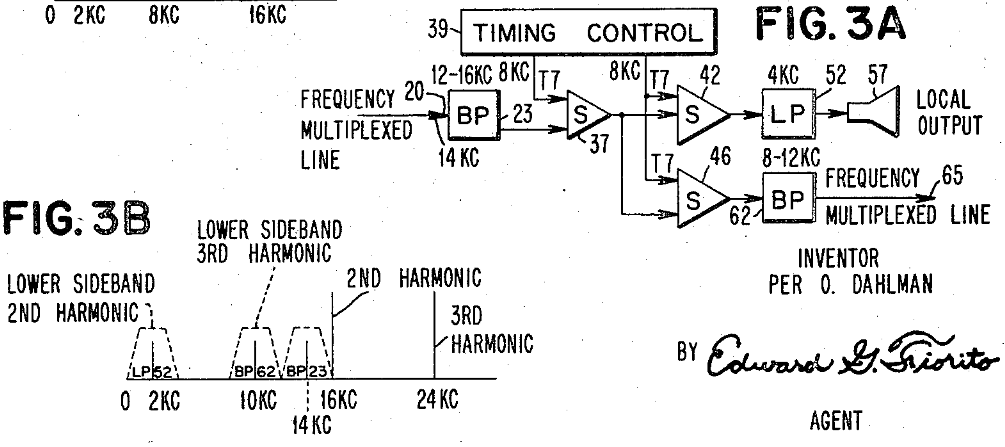
FIG. 3A is a block diagram of another subcombination included in FIG. 1.
FIG. 3B is a frequency scale illustrating the frequency spectrum of a sampled signal in FIG. 3A.

FIG. 3A shows a subcombination of FIG. 1 which illustrates the manner in which a signal on a frequency multiplexed line can be switched either to a local output line or to another region of the spectrum for transmission over a frequency multiplexed line. In this example, it is assumed that a 14 kc. signal exists on the line 20 applied to band-pass filter 23. Since band-pass filter 23 passes a region of frequencies between 12 and 16 kc., the 14 kc. signal passes through filter 23 and is applied to gate 37. Gate 37 is operated at an eight kc. rate by the timing control 39. The spectrum of the sampled signal at the output of gate 37 is illustrated in FIG. 3B. This spectrum differs from the spectrum illustrated in FIG. 2B in that the sidebands of the harmonics are further removed from their associated harmonic. For example, the lower sideband of the second harmonic is 16 kc.—14 kc., or 2 kc. In a like manner, the low sideband of the third harmonic is 24 kc.—14 kc., or 10 kc.

Either, or both of the gates 42, 46 are operated in synchronism with the gate 37 by the timing control 39. Therefore, the sampled signal having the spectrum shown in FIG. 3B is applied to either low-pass filter 52 or filter 62, or both. Since low-pass filter 52 passes only frequency components below four kc., the only frequency emerging from this filter is the two kc. frequency, which is the lower sideband of the second harmonic of the sampling rate. This two kc. signal is applied to the transducer 57 providing a local output. In this manner, a 14 kc. signal from a frequency multiplexed line is switched to a local output at an audio frequency range. The timing control 39 selects which local output is to receive the signal by opening one of the gates 41–44.

The 14 kc. signal in FIG. 3A can be switched to a 10 kc. region of the frequency spectrum for transmission over the frequency multiplexed line 65 in the following manner. Band-pass filter 62 receives the sampled signal having the spectrum shown in FIG. 3B. Only frequency components between the region 8–12 kc. are passed through filter 62. The only frequency component in the spectrum, FIG. 3B, within this region is the 10 kc. lower sideband of the third harmonic. Therefore the band-pass filter 62 provides a 10 kc. signal to the frequency multiplexed line 65 in response to the original 14 kc. signal applied to band-pass filter 23. The original 14 kc. signal can be shifted to a 6 kc., 10 kc., 14 kc., or 18 kc. frequency by opening any one of the gates 45–48 in synchronism with gate 37.

A two kc. signal and a 14 kc. signal have been used for illustrative purposes in the explanation above. It is apparent that a band of frequencies would operate in the same manner. For example, in FIG. 2A a band of frequencies between zero and four kc. could be switched to the local output resulting in an output bandwidth between zero and four kc. The same input band of frequencies could have been switched to the frequency region between 12 and 16 kc. for transmission over the line 65. In practice it may be desirable to limit the bandwidth of the local input signals to about 100 to 3,500 cycles per second in order to prevent cross talk between different channels. This is evident when examining the frequency spectrum in FIG. 2B, since if the sidebands were exactly four kc. wide the upper sideband of one harmonic would touch the lower sideband of an adjacent harmonic making it extremely difficult for the filters on the output side to select out a particular sideband. For the same reason, it would be desirable to provide guard bands between the channels in the frequency multiplexed line 20.

Another modification that might be desirable for certain applications would be to insert amplification in the various stages of the switching system.

Although only one frequency multiplexed line 20 has been illustrated in FIG. 1, it is apparent that additional frequency multiplexed lines could be added to the input along with a plurality of sampling gates. Additional frequency multiplexed lines could be added at the output along with associated gates. Sequential sampling of the additional gates at the input and distribution by the additional gates at the output would be performed in the same manner, resulting in increased flexibility and choice in switching the input signals to the various local output lines and frequency multiplexed lines. Also, the invention could be expanded into a larger system including a plurality of time multiplexed lines by inserting intermediate sampling gates between those gates shown.

It is also apparent that the local lines could be eliminated leaving just the frequency multiplexed lines 20 and 65, where it is desirable to switch between only frequency multiplexed channels, thus essentially achieving frequency divided switching.

While the invention has been particularly shown and described with reference to a preferred embodiment thereof, it will be understood by those skilled in the art that the foregoing changes in form and details may be made therein without departing from the spirit and scope of the invention.

What is claimed is:

1. A multichannel communication system comprising in combination:

a time division multiplexed system including a plurality of input sampling gates operated sequentially on a time divided basis, each one at a certain sampling rate, a plurality of output sampling gates each one opened in synchronism with at least one of said input gates, and circuit means for connecting the output of each of said input gates to all of said output gates;

a frequency multiplexed line capable of transmitting a plurality of signals occupying different frequency bands, each of said bands lying between a different pair of consecutive integral multiples of one-half of said sampling rate;

means for separating the signals in said line and applying each signal to a different one of a group of said input gates, said means including a plurality of filters each one having a band-pass coextensive with the frequency band of a different one of said signals;

a plurality of low frequency signal sources each of the signals from said sources having a maximum frequency less than one-half of said sampling rate;

circuit means for accepting said low frequency signals and applying each one of said low frequency signals to a different one of another group of said input gates; and means for distributing each of the output signals from said output gates into separate frequency bands for transmission over a frequency multiplexed line, said last-mentioned means including a plurality of filters each having a bandwidth lying between a different pair of consecutive integral multiples of one-half of said sampling rate.

2. A multichannel communication system comprising in combination:

a time division multiplexed system including a plurality of input sampling gates operated sequentially on a time divided basis, each one at a certain sampling rate, a plurality of output sampling gates each one opened in synchronism with at least one of said input gates, and circuit means for connecting the output of each of said input gates to all of said output gates;

a frequency multiplexed line capable of transmitting a plurality of signals occupying different frequency bands, each of said bands lying between a different pair of consecutive integral multiples of one-half of said sampling rate;

means for separating the signals in said frequency multiplexed line and applying each signal to a different one of a group of said input gates, said means including a plurality of filters each one having a band-pass coextensive with the frequency band of a different one of said signals;

a plurality of low frequency signals each occupying a frequency band lower than one-half of said sampling rate;

circuit means for accepting said low frequency signals and applying each one of said low frequency signals to a different one of another group of said input gates;

means for distributing each of the output signals from a group of said output gates into separate frequency bands for transmission over a frequency multiplexed line, said last-mentioned means including a plurality of filters having bandwidths lying between different pairs of consecutive integral multiples of one-half of said sampling rate; and means for recovering a low frequency signal from the output of another group of said output gates, said last-mentioned means including a plurality of low-pass filters having a band-pass region less than one-half of said sampling rate.

References Cited

UNITED STATES PATENTS

| | | | |
|---|---|---|---|
| 2,878,316 | 3/1959 | Boothroyd | 179—15 |
| 2,935,569 | 5/1960 | Saal et al. | 179—15 |
| 2,975,234 | 3/1961 | Le Blan | 179—15 |
| 3,205,310 | 9/1965 | Schlichte | 179—15 |
| 2,303,907 | 12/1942 | Black. | |

FOREIGN PATENTS

| | | |
|---|---|---|
| 1,023,801 | 2/1958 | Germany. |

ROBERT L. GRIFFIN, *Primary Examiner.*

R. MURRAY, *Assistant Examiner.*